A. K. ROSENBECK.
TOOL HOLDER.
APPLICATION FILED JULY 27, 1910.
993,553.
Patented May 30, 1911.
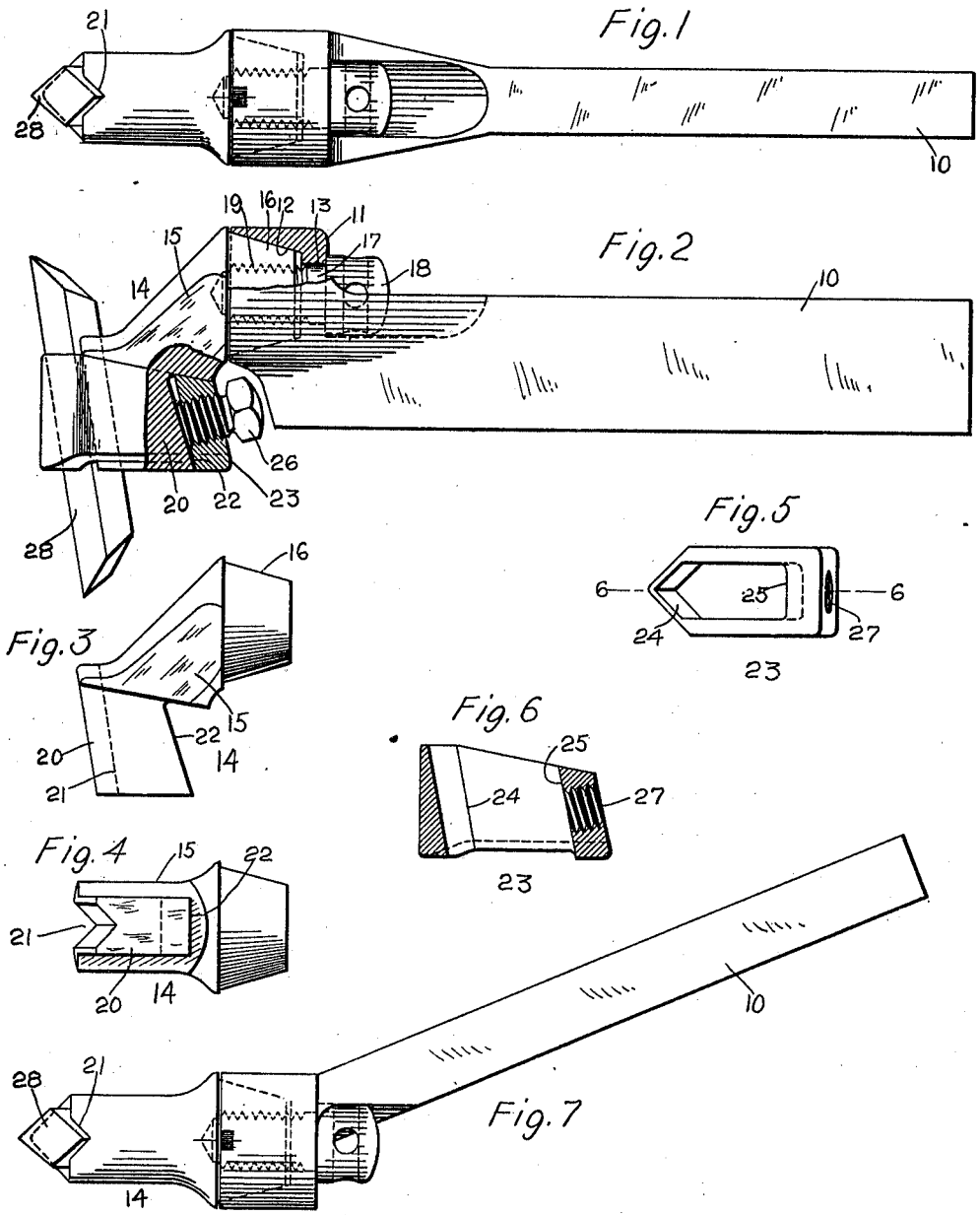

UNITED STATES PATENT OFFICE.

ANDREW K. ROSENBECK, OF NEW HAVEN, CONNECTICUT.

TOOL-HOLDER.

993,553.  Specification of Letters Patent.  Patented May 30, 1911.

Application filed July 27, 1910. Serial No. 574,182.

*To all whom it may concern:*

Be it known that I, ANDREW K. ROSENBECK, a citizen of the United States, residing at New Haven, county of New Haven, State of Connecticut, have invented an Improvement in Tool-Holders, of which the following is a specification.

This invention has for its object to produce a simple and inexpensive tool holder adapted for general use and especially adapted for use as a holder for metal planer tools, provision being made for setting the tool horizontally, vertically, or at any required angle and the tool being held by a carrier and yoke of novel construction which permit quick and convenient insertion, removal and adjustment of tools and which grip the tools in such a manner that strain upon a tool in use tending to cause shifting is transmitted to the holder which is caused to grip the tool with a hold that increases proportionately as the strain upon the tool increases.

With these and other objects in view I have devised the novel tool holder which I will now describe, referring to the accompanying drawing forming a part of this specification and using reference characters to indicate the several parts.

Figure 1 is a plan view of my novel tool holder as in use, the shank being straight; Fig. 2 a side elevation corresponding therewith, partly in vertical section to show the mode of locking the tool; Fig. 3 a side elevation of the tool carrier detached; Fig. 4 an inverted plan view corresponding therewith; Fig. 5 a plan view of the yoke detached; Fig. 6 a section of the yoke on the line 6—6 in Fig. 5, and Fig. 7 is a view similar to Fig. 1 showing the head provided with an oblique shank.

10 denotes the shank of my novel tool holder and 11 the head which may be set straight on the shank as in Figs. 1 and 2 or obliquely thereto as in Fig. 7. The head is provided with a circular beveled socket 12 and with a hole 13 extending inward therefrom and through the head.

14 denotes the tool carrier which is provided with a base 15 having a beveled portion 16 which just fits in the socket 12 and is adapted to rotate therein to provide for adjusting the carrier at any required angle.

The tool carrier and tool are locked to the head after adjustment by means of a screw 17 having a head 18 which bears upon the rear of head 11, the screw passing through hole 13 freely and engaging a threaded hole 19 in beveled portion 16 of the carrier. The base 15 of the tool carrier is disposed obliquely to beveled portion 16 and has an arm 20 extending at an obtuse angle therefrom. This arm is provided in its face with an angular groove 21 which lies at an acute angle to the plane of work, or in other words at an acute angle to a line transverse to the center line of beveled portion 16. The back of arm 20, indicated specifically by 22, lies at a slightly greater angle to the plane of work. The exact angle of groove 21 and back 22 to each other, or the exact angle of either the groove or the back to the plane of work are not of the essence of the invention, it being sufficient for the purposes of the invention that the angle of the back is slightly greater than the angle of the groove. For example, the plane of the groove may be at an angle of 10° more or less to the transverse line referred to and the plane of the back may be at an angle of 15° more or less to said transverse line.

23 denotes a yoke which lies over arm 20 and is provided with an angular groove 24 corresponding with the angular groove in arm 20. The back of the yoke, which is specifically indicated by 25, is shown as lying in a plane parallel with the plane of the grooves in the arm and the yoke.

26 denotes a set screw in back 25 the forward end of which is a plane lying at right angles to the center line of the screw. The set screw engages a hole 27 in back 25 which is disposed at right angles to the plane of back 22 so as to place the engaging end of the screw in a plane parallel with the plane of back 22.

28 denotes a tool which is adapted to slide in the grooves in the arm and yoke and which is locked in place therein by tightening up the set screw against the back of the arm as is clearly shown in Fig. 2.

It will be obvious that the strain upon the tool in use will be transmitted to the yoke and the normal tendency will be to slide the yoke off from the arm. This tendency is wholly overcome by making the angle of the back of the arm to the plane of work slightly greater than the angle of the groove and placing the set screw at right angles to the plane of the back of the arm. The arm, therefore, acts as a wedge and the yoke and tool are forced by the strain of use up the angles of the wedge, that is toward its base, the wedging action being transmitted by the yoke to the tool which is clamped between the yoke and the arm with a pressure that increases in proportion to the strain applied to the tool.

Having thus described my invention I claim:

1. A tool holder comprising a base having an arm with a tool groove and a back lying at a slight angle to the axis of said groove, a yoke having a corresponding tool groove and a set screw adapted to engage the back of the arm and lying in a plane at right angles thereto.

2. A tool holder comprising a base having an arm with a tool groove and a back lying at a slight angle to the axis of said groove, a yoke having a corresponding tool groove and a set screw the engaging end of which is a plane parallel with the back of the arm.

3. The combination with a head having a beveled circular socket and a hole extending inward therefrom, and a tool carrier having a base with a beveled portion engaging the socket and an arm with a tool groove lying at an acute angle to the plane of work and a back lying at a greater angle to the plane of work, of a yoke having a corresponding tool groove and a set screw engaging the back of the arm and lying at right angles thereto, and a screw bearing on the head and passing through the hole and engaging the base, whereby the carrier may be adjusted at any angle.

4. The combination with a head having a socket, a tool carrier having a base with a beveled portion engaging the socket and a screw passing through the head and engaging the carrier, for the purpose set forth, of an arm extending from the base and having a tool groove lying at an acute angle to the plane of work and a back lying at a greater angle to the plane of work, a yoke having a corresponding tool groove and a set screw in the yoke engaging the back of the arm and lying at right angles thereto.

5. The combination with a head having a circular beveled socket, a tool carrier having a base with a corresponding beveled portion and an arm extending obliquely therefrom and having a tool groove lying at an acute angle to the plane of work and a back lying at a greater angle to the plane of work, of a yoke having a corresponding tool groove, a set screw in the yoke engaging the back of the arm and lying at right angles thereto and a screw passing through the head and engaging the carrier, for the purpose set forth.

6. The combination with a base having a circular beveled portion and an arm with a tool groove lying at an acute angle to the plane of work, and a back lying at a greater angle to the plane of work, of a yoke having a corresponding tool groove and a set screw adapted to engage the back of the arm and lying in a plane at right angles thereto, a head having a socket corresponding with the beveled portion of the base and means for adjustably securing the base to the head.

In testimony whereof I affix my signature in presence of two witnesses.

ANDREW K. ROSENBECK.

Witnesses:
C. J. ANDERSON,
M. M. FINDLEY.

---

Copies of this patent may be obtained for five cents each, by addressing the "Commissioner of Patents, Washington, D. C."